(12) United States Patent
Gass et al.

(10) Patent No.: US 7,350,444 B2
(45) Date of Patent: Apr. 1, 2008

(54) TABLE SAW WITH IMPROVED SAFETY SYSTEM

(75) Inventors: Stephen F. Gass, Wilsonville, OR (US); David A. Fanning, Vancouver, WA (US); Joel F. Jensen, Redwood City, CA (US); Sung H. Kim, Palo Alto, CA (US); Andrew L. Johnston, Redwood City, CA (US); David S. D'Ascenzo, Portland, OR (US)

(73) Assignee: SD3, LLC, Tualatin, OR (US)

( * ) Notice: Subject to any disclaimer, the term of this patent is extended or adjusted under 35 U.S.C. 154(b) by 112 days.

(21) Appl. No.: 09/929,235

(22) Filed: Aug. 13, 2001

(65) Prior Publication Data

US 2002/0017184 A1  Feb. 14, 2002

Related U.S. Application Data

(60) Provisional application No. 60/225,056, filed on Aug. 14, 2000, provisional application No. 60/225,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B27B 5/29* (2006.01)
*B27B 3/28* (2006.01)
*B23D 45/04* (2006.01)

(52) U.S. Cl. .......................... 83/58; 83/62.1; 83/477.2; 83/490; 83/581; 83/471.3; 83/397.1

(58) Field of Classification Search .................. 83/58, 83/62.1, 63, 68, 488, 477.1, DIG. 1, 32.1, 83/83, 471.1, 477.2, 397.1, 581, 666, 72, 83/471.3, 62, 473, 490, 76.7, 481, 471.2, 83/478, 485, 487, 489, 574, 821, 823, 827, 83/828, 954, 665, 522, 11, 22, 544, 476, 491, 83/526, 76.8, 546; 188/110, 196 R, 206 R, 188/DIG. 1, 196.12, 10; 192/129 A, 129 R, 192/144; 318/366, 375, 759; 30/380, 381, 30/388, 373, 370, 371, 390; 451/1, 6, 9, 451/119, 158, 177; 144/382, 356, 154, 365, 144/117.1, 118; 241/37.5; 125/13.01
See application file for complete search history.

(56) References Cited

U.S. PATENT DOCUMENTS

| | | |
|---|---|---|
| 15,262 A | 7/1856 | Gurgel |
| 146,886 A | 1/1874 | Doane et al. |
| 162,814 A | 5/1875 | Graves et al. |
| 261,090 A | 7/1882 | Grill |
| 264,412 A | 9/1882 | Kuhlmann |
| 299,480 A | 5/1884 | Kuhlmann et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |

| Patent No. | Date | Name | | Patent No. | Date | Name |
|---|---|---|---|---|---|---|
| 1,154,209 A | 9/1915 | Rushton | | 2,452,589 A | 11/1948 | McWhirter et al. |
| 1,205,246 A | 11/1916 | Mowry | | 2,466,325 A | 4/1949 | Ocenasek |
| 1,228,047 A | 5/1917 | Reinhold | | 2,496,613 A | 2/1950 | Woodward |
| 1,240,430 A | 9/1917 | Erickson | | 2,501,134 A * | 3/1950 | Meckoski et al. .......... 144/1.1 |
| 1,244,187 A | 10/1917 | Frisbie | | 2,509,813 A | 5/1950 | Dineen |
| 1,255,886 A | 2/1918 | Jones | | 2,517,649 A | 8/1950 | Frenchtmann |
| 1,258,961 A | 3/1918 | Tattersall | | 2,518,684 A | 8/1950 | Harris |
| 1,311,508 A | 7/1919 | Harrold | | 2,530,290 A | 11/1950 | Collins |
| 1,324,136 A | 12/1919 | Turner | | 2,554,124 A | 5/1951 | Salmont |
| 1,381,612 A | 6/1921 | Anderson | | 2,572,326 A | 10/1951 | Evans |
| 1,397,606 A | 11/1921 | Smith | | 2,590,035 A | 3/1952 | Pollak |
| 1,427,005 A | 8/1922 | McMichael | | 2,593,596 A | 4/1952 | Olson |
| 1,430,983 A | 10/1922 | Granberg | | 2,623,555 A | 12/1952 | Eschenburg |
| 1,450,906 A * | 4/1923 | Anderson ............... 192/224.1 | | 2,625,966 A | 1/1953 | Copp |
| 1,464,924 A | 8/1923 | Drummond | | 2,626,639 A | 1/1953 | Hess |
| 1,465,224 A | 8/1923 | Lantz | | 2,661,777 A | 12/1953 | Hitchcock |
| 1,492,145 A | 4/1924 | Talley | | 2,661,780 A | 12/1953 | Morgan |
| 1,496,212 A | 6/1924 | French | | 2,675,707 A | 4/1954 | Brown |
| 1,511,797 A | 10/1924 | Berghold | | 2,678,071 A | 5/1954 | Odlum et al. |
| 1,526,128 A | 2/1925 | Flohr | | 2,690,084 A | 9/1954 | Van Dam |
| 1,527,587 A | 2/1925 | Hutchinson | | 2,695,638 A | 11/1954 | Gaskell |
| 1,551,900 A | 9/1925 | Morrow | | 2,704,560 A | 3/1955 | Woessner |
| 1,553,996 A | 9/1925 | Federer | | 2,711,762 A | 6/1955 | Gaskell |
| 1,590,988 A | 6/1926 | Campbell | | 2,719,547 A | 10/1955 | Gjerde |
| 1,600,604 A | 9/1926 | Sorlien | | 2,722,246 A | 11/1955 | Arnoldy |
| 1,616,478 A | 2/1927 | Watson | | 2,731,049 A | 1/1956 | Akin |
| 1,640,517 A | 8/1927 | Procknow | | 2,736,348 A | 2/1956 | Nelson |
| 1,662,372 A | 3/1928 | Ward | | 2,737,213 A | 3/1956 | Richards et al. |
| 1,668,061 A | 5/1928 | Falkins | | 2,758,615 A | 8/1956 | Mastriforte |
| 1,701,948 A | 2/1929 | Crowe | | 2,785,710 A * | 3/1957 | Mowery, Jr. .................. 83/68 |
| 1,711,490 A | 5/1929 | Drummond | | 2,786,496 A | 3/1957 | Eschenburg |
| 1,712,828 A | 5/1929 | Klehm | | 2,804,890 A | 9/1957 | Fink |
| 1,774,521 A | 9/1930 | Neighbour | | 2,810,408 A | 10/1957 | Boice et al. |
| 1,807,120 A | 5/1931 | Lewis | | 2,839,943 A | 6/1958 | Caldwell et al. |
| 1,811,066 A * | 6/1931 | Tannewitz ..................... 83/68 | | 2,844,173 A | 7/1958 | Gaskell |
| 1,879,280 A | 9/1932 | James | | 2,850,054 A | 9/1958 | Eschenburg |
| 1,896,924 A | 2/1933 | Ulrich | | 2,852,047 A | 9/1958 | Odlum et al. |
| 1,902,270 A | 3/1933 | Tate | | 2,873,773 A | 2/1959 | Gaskell |
| 1,904,005 A | 4/1933 | Masset | | 2,876,809 A | 3/1959 | Rentsch et al. |
| 1,910,651 A | 5/1933 | Tautz | | 2,883,486 A | 4/1959 | Mason |
| 1,938,548 A | 12/1933 | Tautz | | 2,894,546 A | 7/1959 | Eschenburg |
| 1,938,549 A | 12/1933 | Tautz | | 2,913,025 A | 11/1959 | Richards |
| 1,963,688 A | 6/1934 | Tautz | | 2,913,581 A | 11/1959 | Simonton et al. |
| 1,988,102 A | 1/1935 | Woodward | | 2,937,672 A | 5/1960 | Gjerde |
| 1,993,219 A | 3/1935 | Merrigan | | 2,945,516 A | 7/1960 | Edgemond, Jr. et al. |
| 2,007,887 A | 7/1935 | Tautz | | 2,954,118 A | 9/1960 | Anderson |
| 2,010,851 A | 8/1935 | Drummond | | 2,957,166 A | 10/1960 | Gluck |
| 2,020,222 A | 11/1935 | Tautz | | 2,978,084 A | 4/1961 | Vilkaitis |
| 2,038,810 A | 4/1936 | Tautz | | 2,984,266 A * | 5/1961 | Vuichard ..................... 83/68 |
| 2,044,481 A | 6/1936 | Manley et al. | | 3,005,477 A | 10/1961 | Sherwen |
| 2,075,282 A | 3/1937 | Hedgpeth | | 3,007,501 A | 11/1961 | Mundell et al. |
| 2,095,330 A | 10/1937 | Hedgpeth | | 3,011,529 A | 12/1961 | Copp |
| 2,106,288 A | 1/1938 | Tautz | | 3,011,610 A | 12/1961 | Stiebel et al. |
| 2,106,321 A | 1/1938 | Guertin | | 3,013,592 A | 12/1961 | Ambrosio et al. |
| 2,121,069 A * | 6/1938 | Collins ..................... 83/473 | | 3,021,881 A | 2/1962 | Edgemond, Jr. et al. |
| 2,131,492 A | 9/1938 | Ocenasek | | 3,035,995 A | 5/1962 | Seeley et al. |
| 2,163,320 A | 6/1939 | Hammond | | 3,047,116 A | 7/1962 | Stiebel et al. |
| 2,168,282 A | 8/1939 | Tautz | | 3,085,602 A | 4/1963 | Gaskell |
| 2,241,556 A | 5/1941 | MacMillin et al. | | 3,105,530 A | 10/1963 | Peterson |
| 2,261,696 A | 11/1941 | Ocenasek | | 3,129,731 A | 4/1964 | Tyrrell |
| 2,265,407 A | 12/1941 | Tautz | | 3,163,732 A | 12/1964 | Abbott |
| 2,286,589 A | 6/1942 | Tannewitz | | 3,186,256 A | 6/1965 | Reznick |
| 2,292,872 A | 8/1942 | Eastman | | 3,207,273 A | 9/1965 | Jurin |
| 2,299,262 A | 10/1942 | Uremovich | | 3,213,731 A | 10/1965 | Renard |
| 2,312,118 A | 2/1943 | Neisewander | | 3,224,474 A * | 12/1965 | Bloom ....................... 30/374 |
| 2,313,686 A | 3/1943 | Uremovich | | 3,232,326 A | 2/1966 | Speer et al. |
| 2,328,244 A | 8/1943 | Woodward | | 3,246,205 A | 4/1966 | Miller |
| 2,352,235 A | 6/1944 | Tautz | | 3,249,134 A | 5/1966 | Vogl et al. |
| 2,377,265 A | 3/1945 | Rady | | 3,274,876 A | 9/1966 | Debus |
| 2,392,486 A | 1/1946 | Larsen | | 3,276,497 A * | 10/1966 | Heer ........................... 83/59 |
| 2,402,232 A | 6/1946 | Baker | | 3,306,149 A | 2/1967 | John |
| 2,425,331 A | 8/1947 | Kramer | | 3,315,715 A | 4/1967 | Mytinger |
| 2,434,174 A | 1/1948 | Morgan | | 3,323,814 A | 6/1967 | Phillips |

| | | | | | |
|---|---|---|---|---|---|
| 3,356,111 A | 12/1967 | Mitchell | 4,175,452 A | 11/1979 | Idel |
| 3,368,596 A * | 2/1968 | Comer .................. 83/473 | 4,184,394 A | 1/1980 | Gjerde |
| 3,386,322 A | 6/1968 | Stone et al. | 4,190,000 A | 2/1980 | Shaull et al. |
| 3,439,183 A | 4/1969 | Hurst, Jr. | 4,195,722 A | 4/1980 | Anderson et al. |
| 3,445,835 A | 5/1969 | Fudaley | 4,200,002 A | 4/1980 | Takahashi |
| 3,454,286 A | 7/1969 | Anderson et al. | 4,206,666 A | 6/1980 | Ashton |
| 3,456,696 A | 7/1969 | Gregory et al. | 4,206,910 A | 6/1980 | Biesemeyer |
| 3,512,440 A | 5/1970 | Frydmann | 4,249,117 A | 2/1981 | Leukhardt et al. |
| 3,538,964 A | 11/1970 | Warrick et al. | 4,249,442 A | 2/1981 | Fittery |
| 3,540,338 A | 11/1970 | McEwan et al. | 4,251,599 A | 2/1981 | McCormick |
| 3,554,067 A | 1/1971 | Scutella | 4,255,995 A | 3/1981 | Connor |
| 3,580,376 A | 5/1971 | Loshbough | 4,262,278 A | 4/1981 | Howard et al. |
| 3,580,609 A | 5/1971 | Menge | 4,267,914 A | 5/1981 | Saar |
| 3,581,784 A | 6/1971 | Warrick | 4,270,427 A | 6/1981 | Colberg et al. |
| 3,593,266 A | 7/1971 | Van Sickle | 4,276,459 A | 6/1981 | Willett et al. |
| 3,613,748 A | 10/1971 | De Pue | 4,276,799 A | 7/1981 | Muehling |
| 3,621,894 A | 11/1971 | Niksich | 4,305,442 A | 12/1981 | Currie |
| 3,648,126 A | 3/1972 | Boos et al. | 4,319,146 A | 3/1982 | Wires, Sr. |
| 3,670,788 A | 6/1972 | Pollak et al. | 4,321,841 A | 3/1982 | Felix |
| 3,675,444 A | 7/1972 | Whipple | 4,334,450 A | 6/1982 | Benuzzi |
| 3,680,609 A | 8/1972 | Menge | 4,372,202 A | 2/1983 | Cameron |
| 3,695,116 A | 10/1972 | Baur | 4,374,552 A | 2/1983 | Dayen |
| 3,716,113 A | 2/1973 | Kobayashi et al. | 4,385,539 A | 5/1983 | Meyerhoefer et al. |
| 3,719,103 A | 3/1973 | Streander | 4,391,358 A | 7/1983 | Haeger |
| 3,740,000 A | 6/1973 | Takada | 4,418,597 A | 12/1983 | Krusemark et al. |
| 3,745,546 A | 7/1973 | Struger et al. | 4,427,042 A | 1/1984 | Mitchell et al. |
| 3,749,933 A | 7/1973 | Davidson | 4,466,170 A | 8/1984 | Davis |
| 3,754,493 A | 8/1973 | Niehaus et al. | 4,466,233 A | 8/1984 | Thesman |
| 3,772,590 A | 11/1973 | Mikulecky et al. | 4,470,046 A | 9/1984 | Betsill |
| 3,785,230 A | 1/1974 | Lokey | 4,503,739 A | 3/1985 | Konieczka |
| 3,793,915 A | 2/1974 | Hujer | 4,510,489 A | 4/1985 | Anderson, III et al. |
| 3,805,639 A | 4/1974 | Peter | 4,512,224 A | 4/1985 | Terauchi |
| 3,805,658 A | 4/1974 | Scott et al. | 4,518,043 A | 5/1985 | Anderson et al. |
| 3,808,932 A | 5/1974 | Russell | 4,532,501 A | 7/1985 | Hoffman |
| 3,829,850 A | 8/1974 | Guetersloh | 4,532,844 A | 8/1985 | Chang et al. |
| 3,829,970 A | 8/1974 | Anderson | 4,557,168 A | 12/1985 | Tokiwa |
| 3,858,095 A | 12/1974 | Friemann et al. | 4,559,858 A * | 12/1985 | Laskowski et al. ............ 83/801 |
| 3,861,016 A | 1/1975 | Johnson et al. | 4,560,033 A | 12/1985 | DeWoody et al. |
| 3,863,208 A | 1/1975 | Balban | 4,566,512 A | 1/1986 | Wilson |
| 3,874,747 A | 4/1975 | Case et al. | 4,573,556 A | 3/1986 | Andreasson |
| 3,880,032 A | 4/1975 | Green | 4,576,073 A | 3/1986 | Stinson |
| 3,886,413 A | 5/1975 | Dow et al. | 4,589,047 A | 5/1986 | Gaus et al. |
| 3,889,567 A | 6/1975 | Sato et al. | 4,599,597 A | 7/1986 | Rotbart |
| 3,905,263 A | 9/1975 | Smith | 4,599,927 A | 7/1986 | Eccardt et al. |
| 3,922,785 A | 12/1975 | Fushiya | 4,606,251 A | 8/1986 | Boileau |
| 3,924,688 A | 12/1975 | Cooper et al. | 4,615,247 A | 10/1986 | Berkeley |
| 3,931,727 A | 1/1976 | Luenser | 4,621,300 A | 11/1986 | Summerer |
| 3,946,631 A | 3/1976 | Malm | 4,625,604 A | 12/1986 | Handler et al. |
| 3,947,734 A | 3/1976 | Fyler | 4,637,188 A | 1/1987 | Crothers |
| 3,949,636 A | 4/1976 | Ball et al. | 4,637,289 A | 1/1987 | Ramsden |
| 3,953,770 A | 4/1976 | Hayashi | 4,644,832 A | 2/1987 | Smith |
| 3,960,310 A | 6/1976 | Nussbaum | 4,653,189 A | 3/1987 | Andreasson |
| 3,967,161 A | 6/1976 | Lichtblau | 4,661,797 A | 4/1987 | Schmall |
| 3,974,565 A | 8/1976 | Ellis | 4,672,500 A | 6/1987 | Tholome et al. |
| 3,975,600 A | 8/1976 | Marston | 4,675,664 A | 6/1987 | Cloutier et al. |
| 3,978,624 A | 9/1976 | Merkel et al. | 4,694,721 A | 9/1987 | Brickner, Jr. |
| 4,007,679 A | 2/1977 | Edwards | 4,718,229 A | 1/1988 | Riley |
| 4,016,490 A | 4/1977 | Weckenmann et al. | 4,721,023 A | 1/1988 | Bartlett et al. |
| 4,026,174 A | 5/1977 | Fierro | 4,722,021 A | 1/1988 | Hornung et al. |
| 4,026,177 A | 5/1977 | Lokey | 4,751,603 A | 6/1988 | Kwan |
| 4,047,156 A | 9/1977 | Atkins | 4,756,220 A | 7/1988 | Olsen et al. |
| 4,048,886 A | 9/1977 | Zettler | 4,757,881 A | 7/1988 | Jonsson et al. |
| 4,060,160 A | 11/1977 | Lieber | 4,774,866 A | 10/1988 | Dehari et al. |
| 4,070,940 A | 1/1978 | McDaniel et al. | 4,792,965 A | 12/1988 | Morgan |
| 4,075,961 A | 2/1978 | Harris | 4,805,504 A | 2/1989 | Fushiya et al. |
| 4,077,161 A | 3/1978 | Wyle et al. | 4,831,279 A | 5/1989 | Ingraham |
| 4,085,303 A | 4/1978 | McIntyre et al. | 4,840,135 A | 6/1989 | Yamauchi |
| 4,090,345 A | 5/1978 | Harkness | 4,845,476 A | 7/1989 | Rangeard et al. |
| 4,091,698 A | 5/1978 | Obear et al. | 4,864,455 A | 9/1989 | Shimomura et al. |
| 4,117,752 A | 10/1978 | Yoneda | 4,875,398 A | 10/1989 | Taylor et al. |
| 4,145,940 A | 3/1979 | Woloveke et al. | 4,888,869 A | 12/1989 | Leatherman |
| 4,152,833 A | 5/1979 | Phillips | 4,906,962 A | 3/1990 | Duimstra |
| 4,161,649 A | 7/1979 | Klos et al. | 4,907,679 A | 3/1990 | Menke |

| | | | | | | |
|---|---|---|---|---|---|---|
| 4,934,233 A | 6/1990 | Brundage et al. | | 5,768,786 A | 6/1998 | Kane et al. |
| 4,937,554 A | 6/1990 | Herman | | 5,771,742 A | 6/1998 | Bokaie et al. |
| 4,962,685 A | 10/1990 | Hagstrom | | 5,782,001 A | 7/1998 | Gray |
| 4,964,450 A | 10/1990 | Hughes et al. | | 5,787,779 A | 8/1998 | Garuglieri |
| 4,965,909 A | 10/1990 | McCullough et al. | | 5,791,057 A | 8/1998 | Nakamura et al. |
| 4,969,063 A | 11/1990 | Scott et al. | | 5,791,223 A | 8/1998 | Lanzer |
| 5,020,406 A | 6/1991 | Sasaki et al. | | 5,791,224 A | 8/1998 | Suzuki et al. |
| 5,025,175 A | 6/1991 | Dubois, III | | 5,791,441 A | 8/1998 | Matos et al. |
| 5,042,348 A | 8/1991 | Brundage et al. | | 5,797,307 A | 8/1998 | Horton |
| 5,046,426 A | 9/1991 | Julien et al. | | 5,857,507 A | 1/1999 | Puzio et al. |
| 5,052,255 A | 10/1991 | Gaines | | 5,861,809 A | 1/1999 | Eckstein et al. |
| 5,081,406 A | 1/1992 | Hughes et al. | | 5,875,698 A | 3/1999 | Ceroll et al. |
| 5,082,316 A | 1/1992 | Wardlaw | | 5,880,954 A | 3/1999 | Thomson et al. |
| 5,086,890 A | 2/1992 | Turczyn et al. | | 5,921,367 A | 7/1999 | Kashioka et al. |
| 5,116,249 A | 5/1992 | Shiotani et al. | | 5,927,857 A | 7/1999 | Ceroll et al. |
| 5,119,555 A | 6/1992 | Johnson | | 5,937,720 A | 8/1999 | Itzov |
| 5,122,091 A | 6/1992 | Townsend | | 5,942,975 A | 8/1999 | Sorensen |
| 5,123,317 A | 6/1992 | Barnes, Jr. et al. | | 5,943,932 A * | 8/1999 | Sberveglieri ............... 83/471.3 |
| 5,146,714 A | 9/1992 | Liiber | | 5,950,514 A | 9/1999 | Benedict et al. |
| 5,174,349 A | 12/1992 | Svetlik et al. | | 5,963,173 A | 10/1999 | Lian et al. |
| 5,184,534 A | 2/1993 | Lee | | 5,989,116 A | 11/1999 | Johnson et al. |
| 5,198,702 A | 3/1993 | McCullough et al. | | 6,009,782 A | 1/2000 | Tajima et al. |
| 5,199,343 A | 4/1993 | OBanion | | 6,018,284 A | 1/2000 | Rival et al. |
| 5,201,110 A * | 4/1993 | Bane ..................... 29/564.3 | | 6,037,729 A * | 3/2000 | Woods et al. ............... 318/375 |
| 5,201,684 A | 4/1993 | DeBois, III | | 6,052,884 A | 4/2000 | Steckler et al. |
| 5,206,625 A | 4/1993 | Davis | | 6,062,121 A | 5/2000 | Ceroll et al. |
| 5,207,253 A | 5/1993 | Hoshino et al. | | 6,070,484 A | 6/2000 | Sakamaki |
| 5,212,621 A | 5/1993 | Panter | | 6,095,092 A | 8/2000 | Chou |
| 5,218,189 A | 6/1993 | Hutchison | | 6,112,785 A | 9/2000 | Yu |
| 5,230,269 A | 7/1993 | Shiotani et al. | | 6,119,984 A | 9/2000 | Devine |
| 5,231,906 A | 8/1993 | Kogej | | 6,133,818 A | 10/2000 | Hsieh et al. |
| 5,245,879 A | 9/1993 | McKeon | | 6,148,504 A | 11/2000 | Schmidt et al. |
| 5,257,570 A | 11/1993 | Shiotani et al. | | 6,148,526 A | 11/2000 | Kirn et al. |
| 5,265,510 A | 11/1993 | Hoyer-Ellefsen | | 6,148,703 A | 11/2000 | Ceroll et al. |
| 5,272,946 A | 12/1993 | McCullough et al. | | 6,161,459 A | 12/2000 | Ceroll et al. |
| 5,276,431 A | 1/1994 | Piccoli et al. | | 6,170,370 B1 | 1/2001 | Sommerville |
| 5,285,708 A | 2/1994 | Bosten et al. | | 6,244,149 B1 | 6/2001 | Ceroll et al. |
| 5,293,802 A | 3/1994 | Shiotani et al. | | 6,250,190 B1 | 6/2001 | Ceroll et al. |
| 5,320,382 A | 6/1994 | Goldstein et al. | | 6,257,061 B1 | 7/2001 | Nonoyama et al. |
| 5,321,230 A | 6/1994 | Shanklin et al. | | 6,283,002 B1 | 9/2001 | Chiang |
| 5,331,875 A | 7/1994 | Mayfield | | 6,295,910 B1 | 10/2001 | Childs et al. |
| 5,353,670 A | 10/1994 | Metzger, Jr. | | 6,325,195 B1 | 12/2001 | Doherty |
| 5,377,554 A | 1/1995 | Reulein et al. | | 6,330,848 B1 | 12/2001 | Nishio et al. |
| 5,377,571 A | 1/1995 | Josephs | | 6,336,273 B1 | 1/2002 | Nilsson et al. |
| 5,392,568 A | 2/1995 | Howard, Jr. et al. | | 6,357,328 B1 | 3/2002 | Ceroll et al. |
| 5,392,678 A | 2/1995 | Sasaki et al. | | 6,366,099 B1 | 4/2002 | Reddi |
| 5,423,232 A | 6/1995 | Miller et al. | | 6,404,098 B1 | 6/2002 | Kayama et al. |
| 5,436,613 A | 7/1995 | Ghosh et al. | | 6,405,624 B2 | 6/2002 | Sutton |
| 5,447,085 A | 9/1995 | Gochnauer | | 6,418,829 B1 | 7/2002 | Pilchowski |
| 5,453,903 A | 9/1995 | Chow | | 6,420,814 B1 | 7/2002 | Bobbio |
| 5,471,888 A | 12/1995 | McCormick | | 6,430,007 B1 | 8/2002 | Jabbari |
| 5,503,059 A | 4/1996 | Pacholok | | 6,450,077 B1 | 9/2002 | Ceroll et al. |
| 5,510,587 A | 4/1996 | Reiter | | 6,453,786 B1 | 9/2002 | Ceroll et al. |
| 5,510,685 A | 4/1996 | Grasselli | | 6,460,442 B2 | 10/2002 | Talesky et al. |
| 5,513,548 A | 5/1996 | Garuglieri | | 6,479,958 B1 | 11/2002 | Thompson et al. |
| 5,531,147 A | 7/1996 | Serban | | 6,484,614 B1 | 11/2002 | Huang |
| 5,534,836 A | 7/1996 | Schenkel et al. | | D466,913 S | 12/2002 | Ceroll et al. |
| 5,572,916 A | 11/1996 | Takano | | D469,354 S | 1/2003 | Curtsinger |
| 5,587,618 A | 12/1996 | Hathaway | | 6,502,493 B1 | 1/2003 | Eccardt et al. |
| 5,606,889 A | 3/1997 | Bielinski et al. | | 6,530,303 B1 | 3/2003 | Parks et al. |
| 5,619,896 A | 4/1997 | Chen | | 6,536,536 B1 | 3/2003 | Gass et al. |
| 5,623,860 A | 4/1997 | Schoene et al. | | 6,543,324 B2 | 4/2003 | Dils |
| 5,647,258 A | 7/1997 | Brazell et al. | | 6,546,835 B2 | 4/2003 | Wang |
| 5,648,644 A | 7/1997 | Nagel | | 6,564,909 B1 | 5/2003 | Razzano |
| 5,667,152 A | 9/1997 | Mooring | | 6,575,067 B2 | 6/2003 | Parks et al. |
| 5,671,633 A | 9/1997 | Wagner | | 6,578,460 B2 | 6/2003 | Sartori |
| 5,695,306 A | 12/1997 | Nygren, Jr. | | 6,578,856 B2 | 6/2003 | Kahle |
| 5,720,213 A | 2/1998 | Sberveglieri | | 6,581,655 B2 | 6/2003 | Huang |
| 5,722,308 A | 3/1998 | Ceroll et al. | | 6,595,096 B2 | 7/2003 | Ceroll et al. |
| 5,724,875 A | 3/1998 | Meredith et al. | | D478,917 S | 8/2003 | Ceroll et al. |
| 5,730,165 A | 3/1998 | Philipp | | 6,601,493 B1 | 8/2003 | Crofutt |
| 5,741,048 A | 4/1998 | Eccleston | | 6,607,015 B1 | 8/2003 | Chen |
| 5,755,148 A | 5/1998 | Stumpf et al. | | D479,538 S | 9/2003 | Welsh et al. |

| | | |
|---|---|---|
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,684,750 B2 | 2/2004 | Yu |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,800,819 B2 | 10/2004 | Sato et al. |
| 6,826,992 B1 | 12/2004 | Huang |
| 6,840,144 B2 | 1/2005 | Huang |
| 6,854,371 B2 | 2/2005 | Yu |
| 6,874,397 B2 | 4/2005 | Chang |
| 6,874,399 B2 | 4/2005 | Lee |
| 6,883,397 B2 | 4/2005 | Kimizuka |
| 6,889,585 B1 | 5/2005 | Harris et al. |
| 6,920,814 B2 | 7/2005 | Gass et al. |
| 6,945,148 B2 | 9/2005 | Gass et al. |
| 6,945,149 B2 | 9/2005 | Gass et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,098,800 B2 | 8/2006 | Gass |
| 7,137,326 B2 | 11/2006 | Gass et al. |
| 2002/0043776 A1 | 4/2002 | Chuang |
| 2002/0050201 A1 | 5/2002 | Lane et al. |
| 2002/0088325 A1 | 7/2002 | Talesky et al. |
| 2002/0096030 A1 | 7/2002 | Wang |
| 2002/0096591 A1 | 7/2002 | Tanji |
| 2002/0109036 A1 | 8/2002 | Denen et al. |
| 2002/0134212 A1 | 9/2002 | Ceroll et al. |
| 2002/0174755 A1 | 11/2002 | Behne et al. |
| 2003/0000359 A1 | 1/2003 | Eccardt et al. |
| 2003/0005588 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0074873 A1 | 4/2003 | Freiberg et al. |
| 2003/0089212 A1 | 5/2003 | Parks et al. |
| 2003/0101857 A1 | 6/2003 | Chuang |
| 2003/0109798 A1 | 6/2003 | Kermani |
| 2003/0213349 A1 | 11/2003 | Chang |
| 2004/0011177 A1 | 1/2004 | Huang |
| 2004/0060404 A1 | 4/2004 | Metzger, Jr. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0255745 A1 | 12/2004 | Peot et al. |
| 2005/0057206 A1 | 3/2005 | Uneyama |
| 2005/0092149 A1 | 5/2005 | Hartmann |
| 2005/0139055 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0123960 A1 | 6/2006 | Gass et al. |
| 2006/0123964 A1 | 6/2006 | Gass et al. |
| 2006/0179983 A1 | 8/2006 | Gass et al. |
| 2006/0219076 A1 | 10/2006 | Gass et al. |
| 2006/0225551 A1 | 10/2006 | Gass |
| 2006/0230896 A1 | 10/2006 | Gass |
| 2006/0247795 A1 | 11/2006 | Gass et al. |
| 2006/0254401 A1 | 11/2006 | Gass et al. |
| 2006/0272463 A1 | 12/2006 | Gass |

FOREIGN PATENT DOCUMENTS

| | | |
|---|---|---|
| CH | 297525 | 6/1954 |
| DE | 76186 | 8/1921 |
| DE | 2800403 | 7/1979 |
| DE | 3427733 | 1/1986 |
| DE | 4205965 C1 | 2/1992 |
| DE | 4235161 A1 | 5/1993 |
| DE | 20102704 | 2/2001 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 | 11/1994 |

OTHER PUBLICATIONS

*You Should Have Invented It*, French television show video.
Gordon Engineering Corp., Product Catalog, Oct. 1997, pp. cover, 1, 3 and back, Brookfield, Connecticut, US.
Analog Devices, Inc., 3-Axis Capacitive Sensor—Preliminary Technical Data AD7103, pp. 1-40, © 1998.
Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Excaliber T-Slot Precision Saw Fence Model TT45 Owner's Manual, Sommerville Design & Manufacturing, Inc. May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Laguna Tools table saw owner's manual, date unknown.
Tablesaw Splitters and Blade Covers, *Fine Woodworking*, pp. 77-81, Dec. 2001.
Young Inventor: Teen's Device Earns Her Trip to Science Fair, *The Arizona Republic*, May 5, 2006.

Operator Injury Mitigation Using Electronic Sensing and Mechanical Braking and Decoupling Devices in Handheld Circular Saws, Erin F. Eppard, date unknown.

Craftsman® Power and Hand Tools, pp. 142-143, 2003.

Grizzly Industrial, Inc. Model G0605X/G0606X Extreme Series 12" Table Saw Owner's Manual, Grizzly Industrial, Inc., Oct. 2006.

* cited by examiner

*Primary Examiner*—Boyer D. Ashley
*Assistant Examiner*—Ghassem Alie

(57) ABSTRACT

A table saw having an adjustable blade, a detection system to detect contact between a person and the blade, and a brake mechanism to engage and stop the blade upon detection of contact between the person and the blade is disclosed. The saw includes a brake positioning system that adjusts the position of the brake mechanism to maintain the brake mechanism in an operative position relative to the blade as the position of the blade is adjusted. The saw also may include a retraction system that urges the blade downward, away from a user, upon detection of contact between a person and the blade. The retraction system may include a releasable gear. The saw may be constructed so that the blade is adjustable up and down around a pivot point downstream of the blade relative to the feed direction.

6 Claims, 7 Drawing Sheets

TABLE SAW WITH IMPROVED SAFETY SYSTEM

CROSS REFERENCE TO RELATED APPLICATIONS

This application claims the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60 /225,201, filed Aug. 14, 2000, Ser. No. 60 /225,206, filed Aug. 14, 2000, Ser. No. 60/225, 210, filed Aug. 14, 2000, Ser. No. 60/225,211, filed Aug. 14, 2000, and Ser. No. 60/225,212, filed Aug. 14, 2000.

FIELD

The present invention relates to table saws and more particularly to a table saw with an improved safety system.

BACKGROUND

Table saws are a type of woodworking machinery used to cut workpieces of wood, plastic and other materials. Table saws include a flat surface or table with a circular saw blade extending up through a slot in the table. A user slides a workpiece on the table against and past the blade while the blade is spinning to cut the workpiece.

Of all the tools in a wood working shop, table saws present perhaps the greatest risk of injury. Table saws present a risk of injury to users because the spinning blade is often exposed when in use. The blade cuts very quickly and can sever a finger upon the slightest slip or misplacement. Accordingly, safety features or systems have been developed to minimize the risk of injury. Probably the most common safety feature is a blade guard that physically blocks a user from making contact with the spinning blade. In many cases, blade guards effectively reduce the risk of injury, however, there are many instances where the nature of the operations to be performed precludes using a guard that completely blocks access to the blade. There exists a need for a table saw with a safety system that significantly reduces the risk of serious injury from a user accidentally contacting the spinning blade.

DETAILED DESCRIPTION

Figure 1:
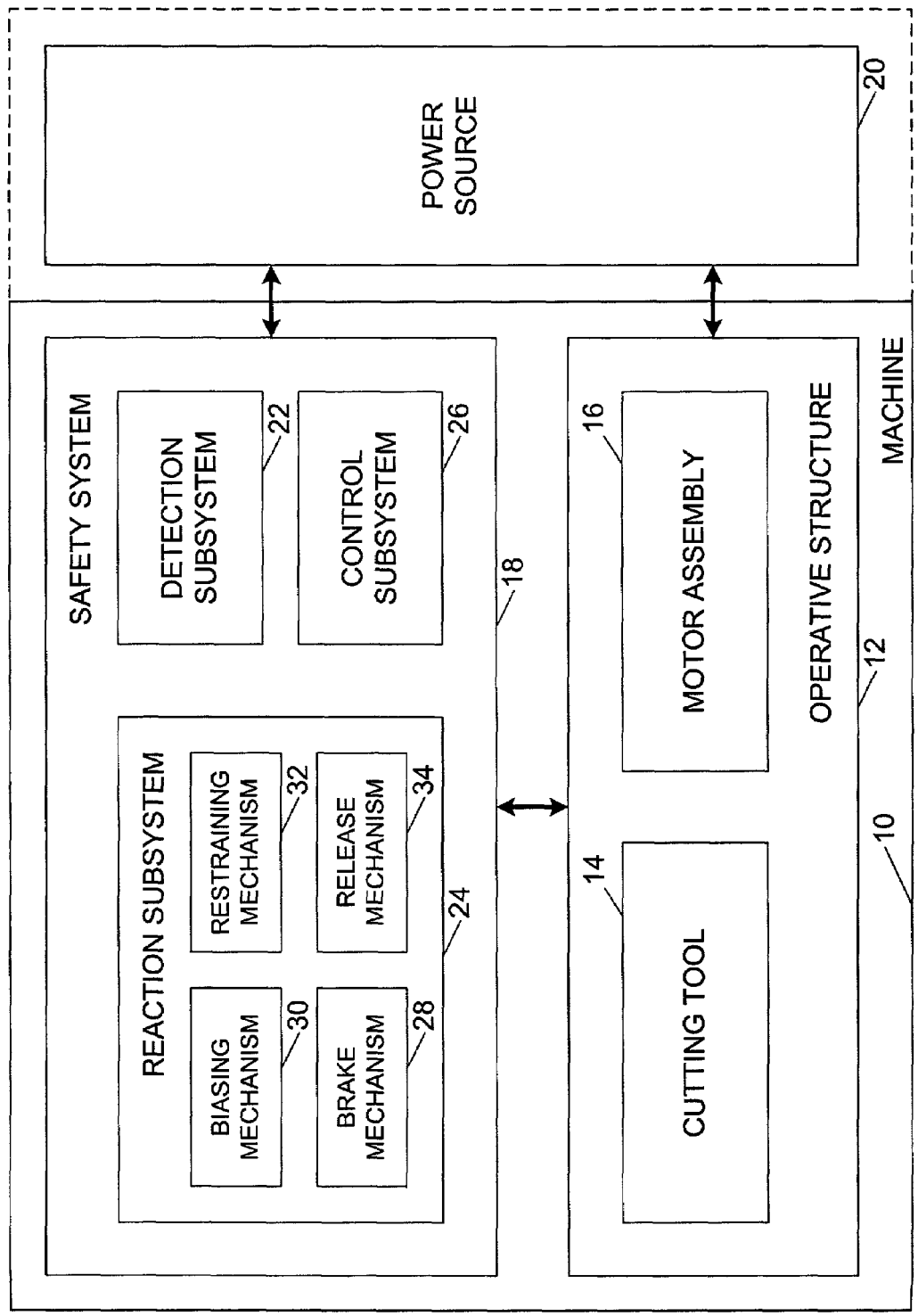
FIG. 1 is a schematic block diagram of a machine with a fast-acting safety system.

Machine 10 may be any of a variety of different table saws. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cuffing tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. Nos. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
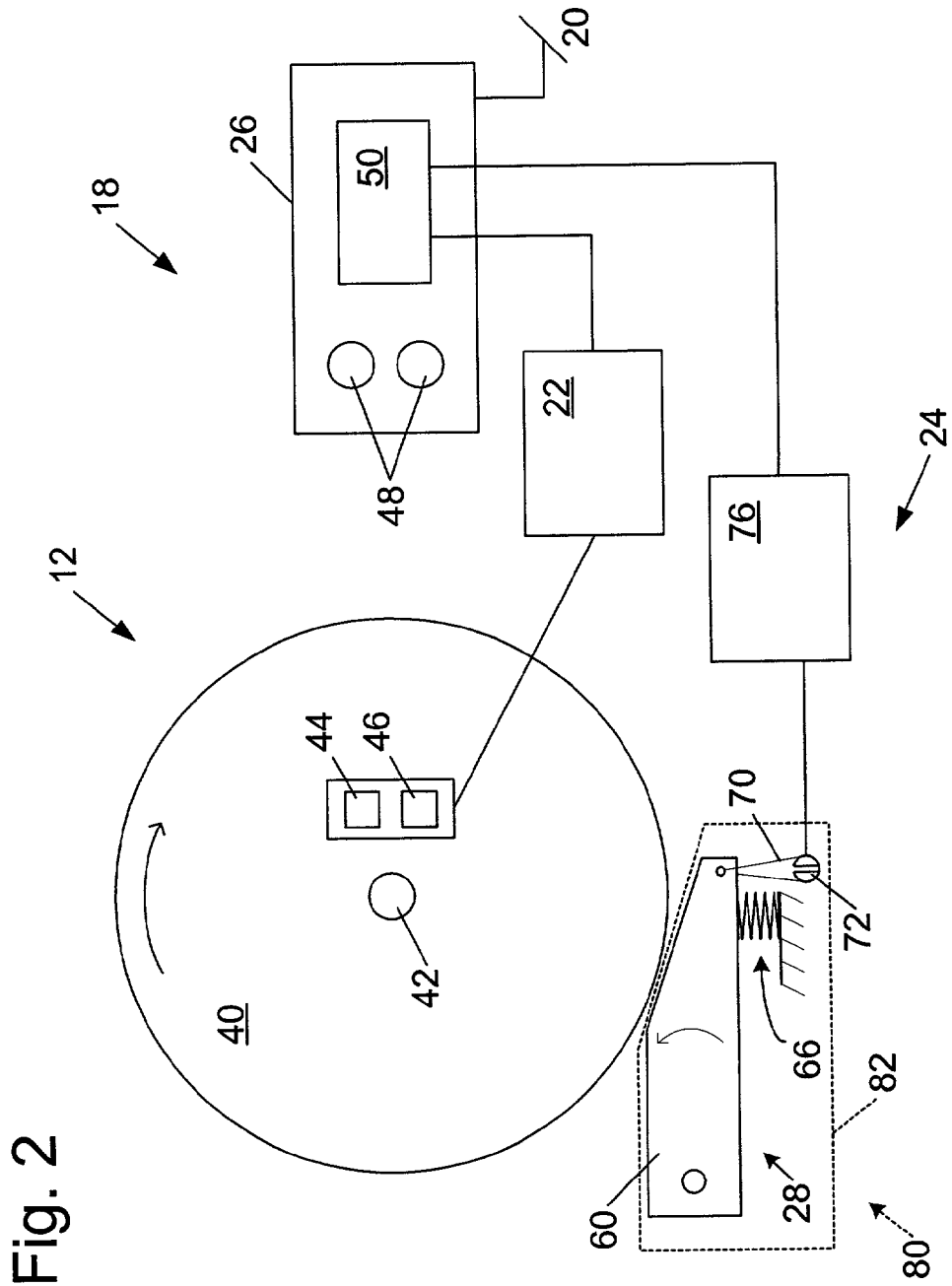
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,057, entitled "Miter Saw With Improved Safety System," filed Aug. 14, 2000 by SD3, LLC, the disclosure of which is herein incorporated by reference, describes safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. Nos. 60/182,866 and 60/157,340, the disclosures of which are herein incorporated by reference.

Figure 3:
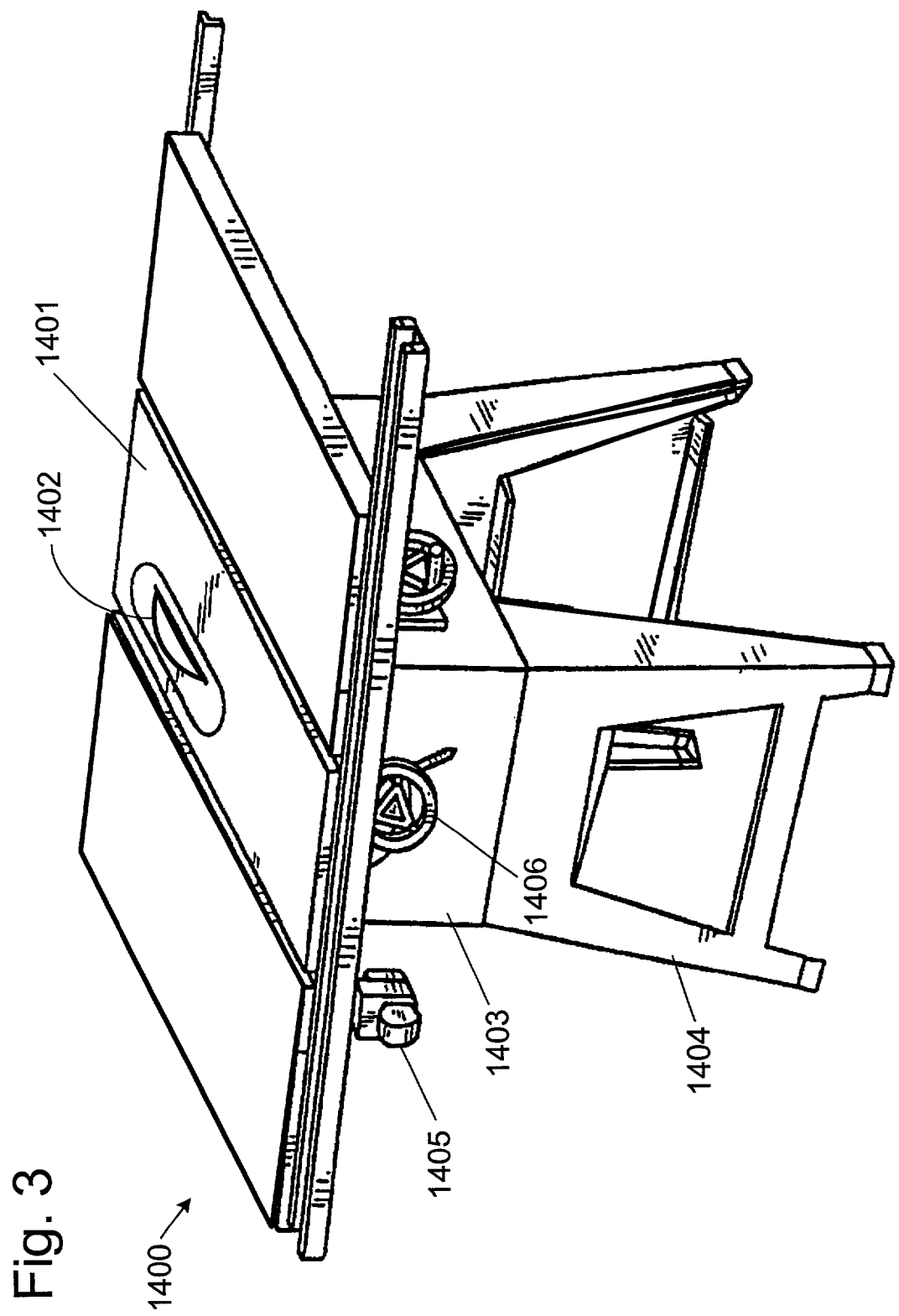
FIG. 3 shows a table saw.

FIG. 3 shows one type of a table saw 1400, often called a contractor's saw. It includes a table 1401 through which a blade 1402 extends from beneath the table. The table and blade are supported by a housing 1403 and legs 1404. Housing 1403 encloses the mechanics that support, position and drive the blade. A motor to drive the blade can be positioned in or outside of the housing. A switch 1405 turns the saw on and off, causing blade 1402 to spin. Handles, such as handle 1406, are used to adjust the position of the blade relative to the table, for example, how far the blade extends above the table or how the blade tilts relative to the top of the table. Of course, table saws take many different configurations, from large saws sized for industrial use to small saws that can be placed on a bench top or counter, and table saws come with various types of tables and housings. Essentially, a table saw is a saw with a flat workspace or "table" and a cutting blade projecting up through the table. A user places a workpiece on the table and slides it into the blade to cut the workpiece.

Figure 4:
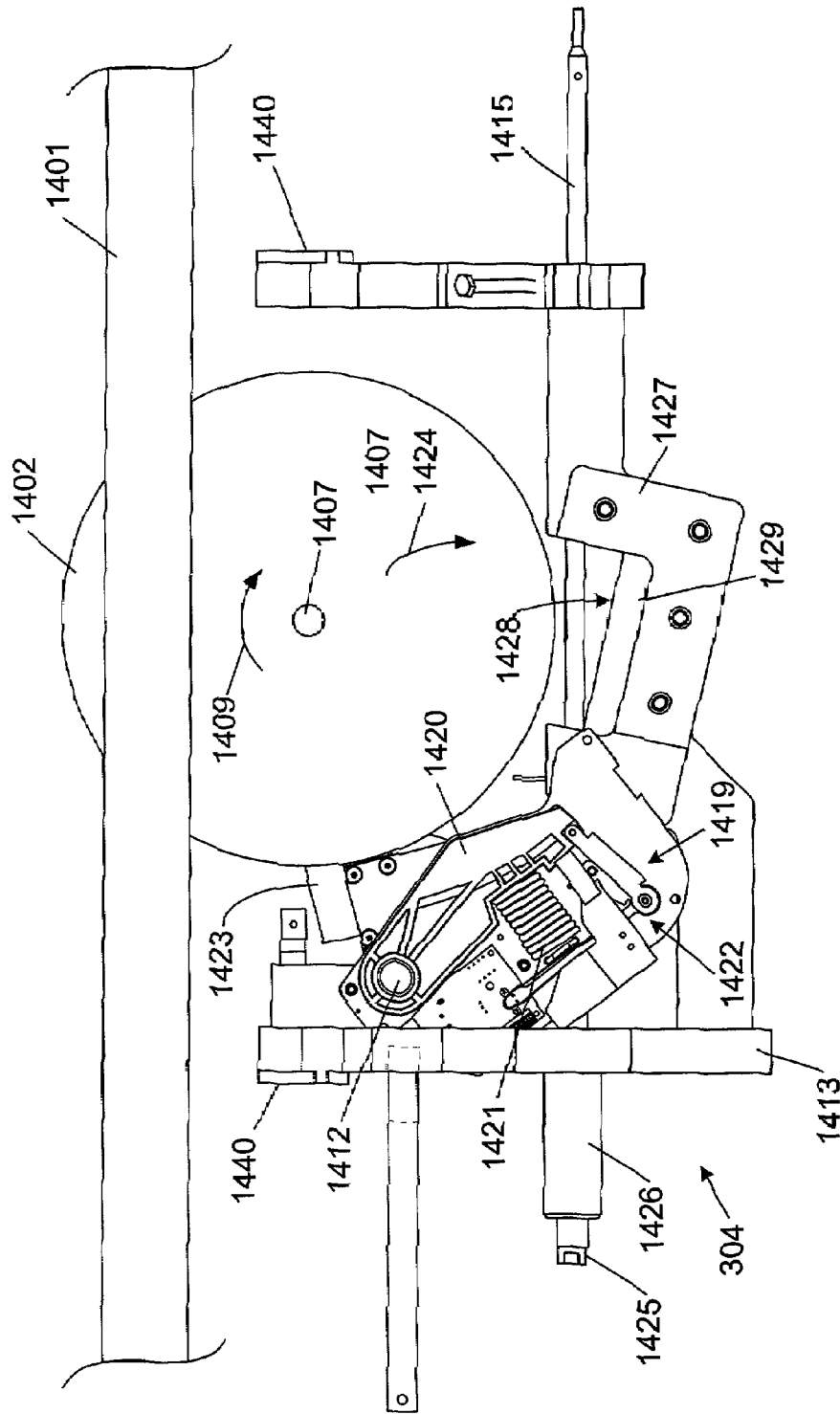
FIG. 4 is a schematic side view of one side of a table saw with an improved safety system.
Figure 5:
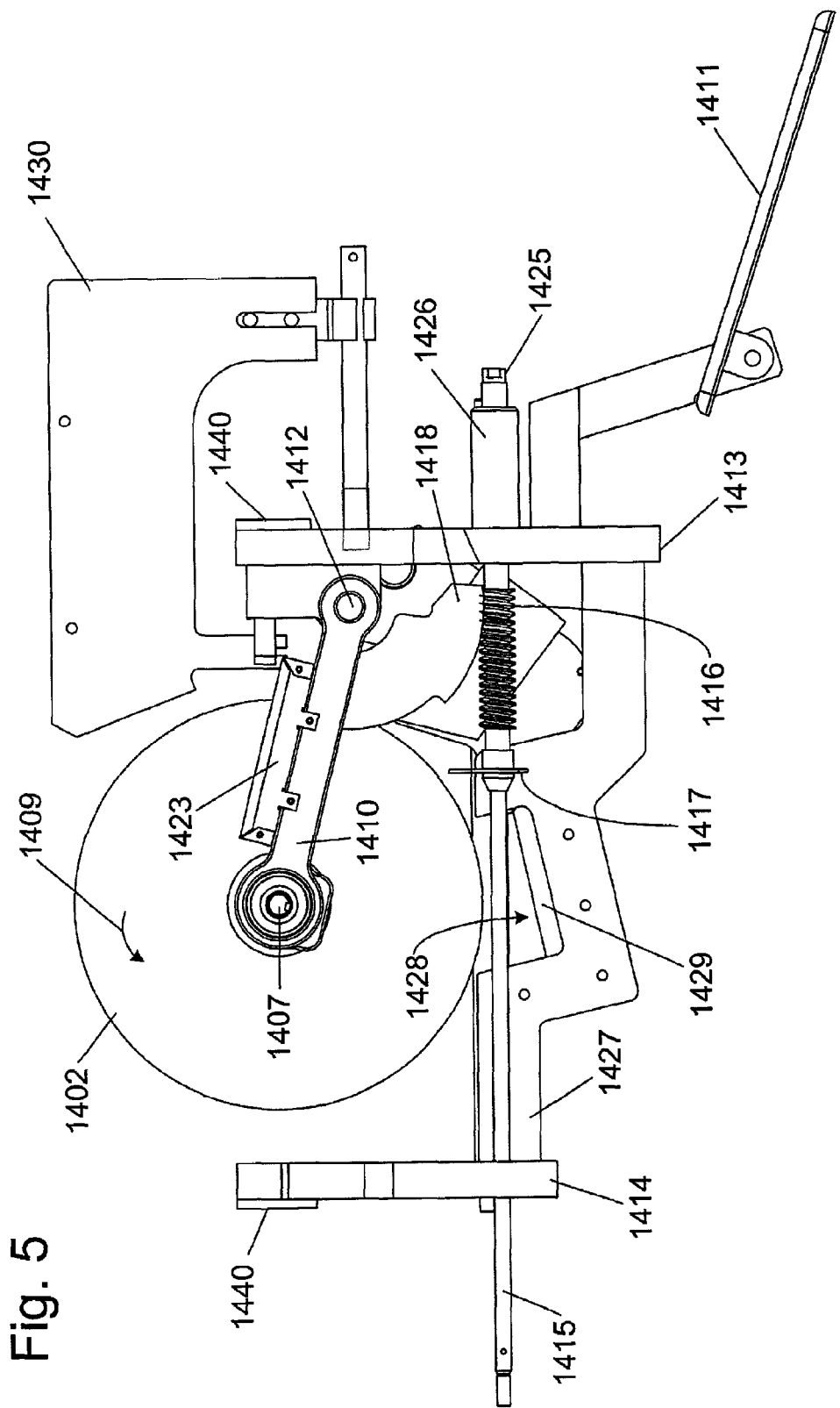
FIG. 5 is a schematic side view of a second side of the table saw of FIG. 4.
Figure 6:
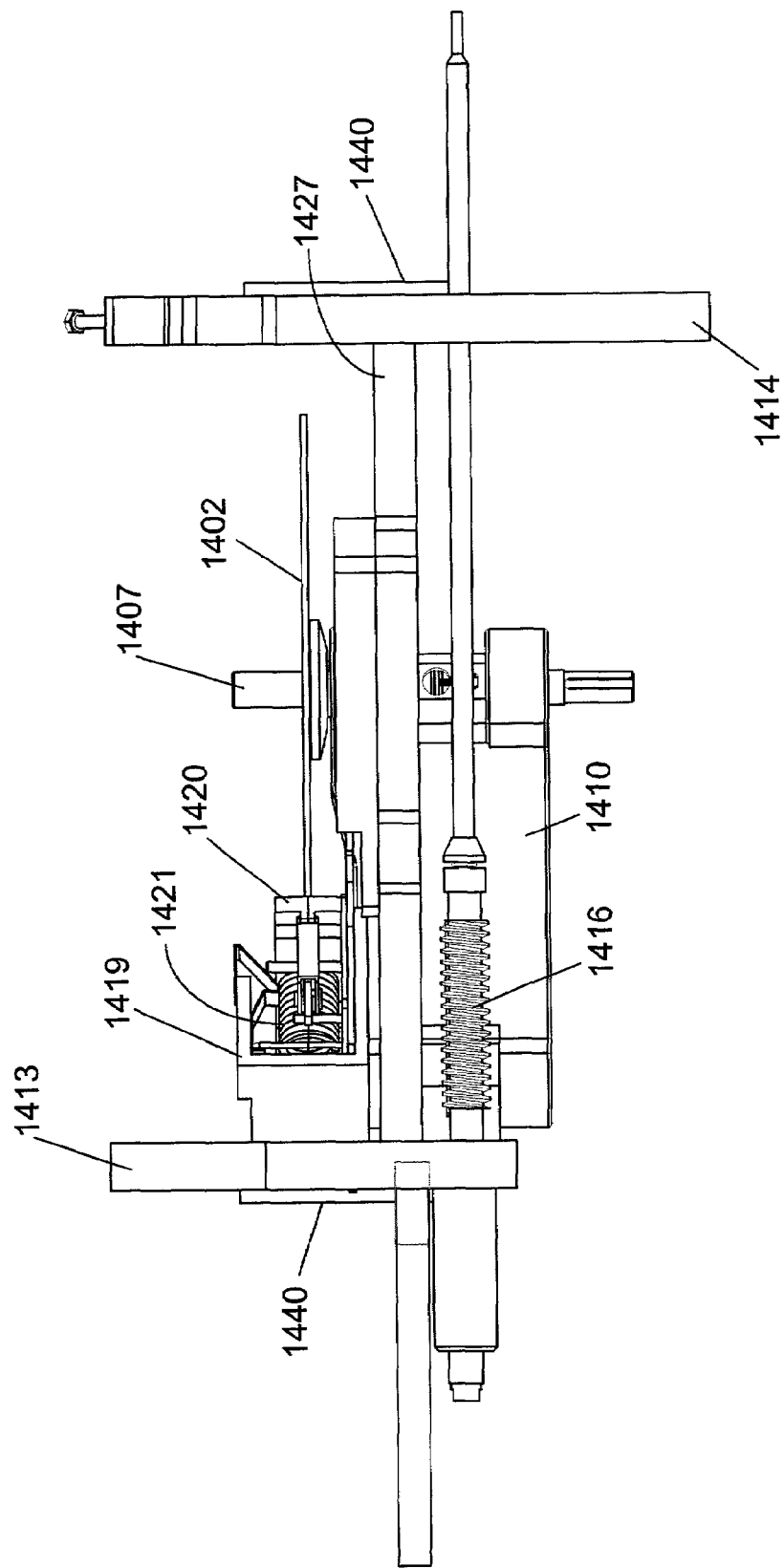
FIG. 6 is a schematic bottom view of the table saw of FIG. 4.
Figure 7:
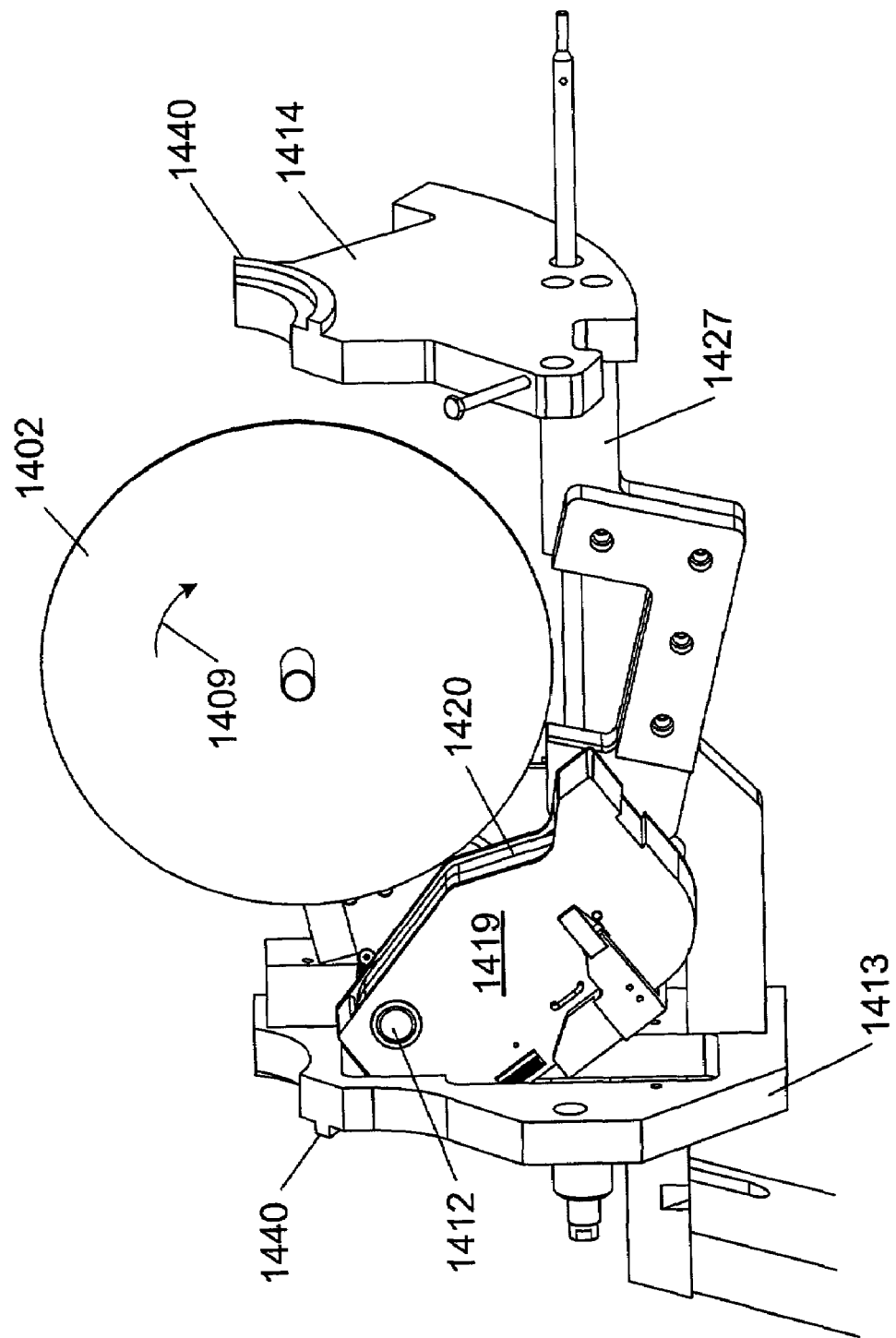
FIG. 7 is a schematic perspective view of the table saw of FIG. 4.

FIGS. 4 and 5 show side elevation views of the internal mechanism one type of table saw configured with a safety system as described above. FIG. 6 shows a bottom view of the same saw, and FIG. 7 shows a perspective view.

In the saw, blade 1402 is mounted on an arbor 1407 by a nut (not shown). The arbor spins the blade in the direction of arrow 1409. Table 1401 (not shown in FIG. 5), which defines the work surface for the table saw, is adjacent the blade and the blade extends above the table.

An arbor block 1410 supports arbor 1407 and holds the arbor in bearings to allow the arbor to rotate. The arbor is connected to a motor (not shown), such as by belt extending around a pulley on the arbor and a pulley on the motor's drive shaft, and the motor drives or spins the arbor, as is known in the art. The motor may be mounted on motor plate 1411 shown in FIG. 5.

Arbor block 1410 is also mounted on a pin 1412 and may pivot around that pin. Pin 1412, in turn, is mounted to a support member 1413 that, along with another support member 1414, comprise at least part of the supporting frame of the table saw. The supporting frame is connected to the housing, legs, and/or table.

Blade 1402 is configured to pivot up and down so that a user can position the blade to extend above the table as needed. The blade pivots around pin 1412. A user may pivot the blade to adjust its position by turning a shaft 1415 on which a worm gear 1416 is mounted. The worm gear is mounted on the shaft so that it turns with the shaft, but so that it may slide on the shaft when necessary, as explained below. Worm gear 1416 is mounted on shaft 1415 like a collar, with the shaft extending through a longitudinal hole in the worm gear. The worm gear is held in place during normal operation of the saw by a spring clip 1417, which is positioned in a notch or channel on the worm gear and which also engages a detent or groove on shaft 1415 to hold the worm gear in place. The worm gear engages a rack or segment gear 1418 that is connected to or part of arbor block 1410. Thus, when a user turns shaft 1415, such as by turning a knob or handle attached to the shaft, like handle 1406 in FIG. 3, worm gear 1416 moves rack 1418 and the blade up and down, depending on the direction that the worm gear is turned.

Most table saws are also configured to allow blade 1402 to tilt from side to side relative to table 1401. That is accomplished by a system similar to shaft 1415, worm gear 1416, and rack 1418, but oriented generally perpendicularly to the plane of the blade. Support members 1413 and 1414 may be used as part of that system; for example, support member 1414 may comprise a segment gear or rack like rack 1418. The support members include arcuate projections 1440 that fit into arcuate grooves or slides in mounting blocks (not shown) to allow the support members to pivot. The mounting blocks are secured to the table of the saw.

A brake cartridge 1419 is mounted in the saw adjacent blade 1402. (The cartridge is shown open in FIGS. 4 and 6, and shown with a cover in FIG. 7.) The cartridge may be configured as described above and as described in more detail in U.S. Provisional Patent Application Ser. No. 60/225,201, titled "Replaceable Brake Mechanism for Power Equipment," and U.S. Provisional Patent Application Ser. No. 60/225,212, titled "Brake Positioning System," both filed Aug. 14, 2000. The brake cartridge includes a pawl 1420 biased toward blade 1402 by a spring 1421. Various pawls are described in more detail in U.S. Provisional Patent Application Ser. No. 60/225,169, titled "Brake Mechanism for Power Equipment," filed Aug. 14, 2000. The pawl is held away from blade 1402 by a release mechanism 1422, as described generally above and as described in more detail in U.S. Provisional Patent Application Ser. No. 60/225,170, titled "Spring-Biased Brake Mechanism for Power Equipment," filed Aug. 14, 2000. The cartridge is configured so that the release mechanism releases the pawl into the blade upon the receipt of a detection signal, as explained generally above and as explained in more detail in U.S. Provisional Patent Application Ser. No. 60/225,056, titled "Firing Subsystem for use in a Fast-Acting Safety System," filed Aug. 14, 2000. The detection signal that causes the release of the pawl, and the system or systems to generate that signal, are explained in more detail in U.S. Provisional Patent Application Ser. No. 60/225,200, titled "Contact Detection System for Power Equipment," and U.S. Provisional Patent Application Ser. No. 60/225,211, titled "Apparatus and Method for Detecting Dangerous Conditions in Power Equipment," both filed Aug. 14, 2000. Electronics that form at least part of the system to detect contact between a user and the blade, and then to signal the release of the brake pawl, are enclosed in housing 1423 mounted on arbor block 1410. The housing should be closed to prevent sawdust and other particles from entering the housing and potentially damaging the electronics housed therein.

When the pawl is released, the pawl quickly hits the teeth of the blade. The teeth bite into the pawl, stopping the blade. The saw described above can stop the blade in 2-10 milliseconds, thereby reducing the extent of injury caused by accidental contact with the blade.

Brake cartridge 1419 is positioned on the blade's pivot axis so that pawl 1420 can move around pin 1412. Thus, when pawl 1420 hits the blade, the angular momentum of the blade is transferred to the arbor, and the blade, arbor, rack and cartridge tend to retract or move down in the direction of arrow 1424. The blade will move down to the extent permitted by the contact between rack 1418 and worm gear 1416. If the worm gear is fixed in place, the downward movement of the blade may strip teeth on the rack and/or worm gear, and may prevent the blade from moving down as far as desired. In the embodiment shown in FIGS. 4 and 5, the worm gear is adapted to snap free and move on shaft 1415 when the blade hits the pawl.

When the blade hits the pawl, the force of the impact causes spring clip 1417 to snap loose, allowing the worm gear to slide down shaft 1415 toward an end 1425 of the shaft. The spring clip snaps loose because the rack is urged down when the blade is stopped, and the rack contacts the worm gear and forces the worm gear to move. The force of the rack against the worm gear causes the spring clip to snap loose. The worm gear then moves into a receptacle 1426 formed around the end of the shaft. The worm gear is put back in place by simply raising arbor 1410 up, or by rotating shaft 1415 to pivot the blade up, which causes the rack to move up and the worm gear to slide back along shaft 1415 until the spring clip snaps into place on the shaft.

The table saw shown in FIGS. 4 and 5 also includes a support 1427 configured with a seat or region 1428 in which is placed an impact-absorbing material 1429 (shown in FIGS. 4 and 5, but not in FIG. 7). The support is positioned under the arbor and arbor block so that when the blade retracts, the arbor block strikes impact-absorbing material 1429. Support 1427 and impact-absorbing material 1429 act as a barrier to stop the downward movement of the blade. The support is positioned so that blade 1402 may retract a sufficient distance. The impact-absorbing material can be any one of a number of cushioning materials, such as rubber, dense foam, plastic, etc. Alternatively, impact-absorbing material 1429 may be attached to the undersurface of the arbor block instead of on support 1427. Additionally, support 1427 may take many forms. In fact, shaft 1415 may be configured and positioned so that it provides a surface to stop the downward movement of the blade.

In the construction described above, the angular momentum of the blade causes the blade, rack and cartridge to all pivot down when the pawl strikes the blade. Thus, the angular momentum of the blade causes the retraction. Blade 1402 is permitted to move downward a sufficient distant so that the blade is completely retracted. The ability of the blade to retract minimizes any injury from accidental contact with the blade and works simultaneously with the braking system described above. The ability of the blade to retract is in part because the point around which the blade pivots relative to the direction that the blade spins may be described as on what could be thought of as the "back side" of existing table saws. The brake cartridge is also mounted on this "back side," and may be mounted to pivot with the blade as described above, or may be fixedly mounted to the frame of the saw so it does not pivot with the blade and so that the blade climbs down the pawl when the pawl engages the blade. Other configurations to cause the blade to retract, which can be used alone or in conjunction with the embodiment described herein, are described in U.S. Provisional Patent Application Ser. No. 60/225,089, titled "Retraction System for Use in Power Equipment," filed Aug. 14, 2000.

FIG. 5 also shows a splitter 1430 that extends above table 1401 behind blade 1402 to prevent kickback. A blade guard may also substantially enclose blade 1402 and prevent accidental contact with the blade.

Table saws like those described above can include logic controls to test that the saw and its safety system are functioning properly. For example, the logic controls can verify that the brake pawl is in place adjacent the blade, and that the firing system is ready to release the pawl into the blade upon the detection of accidental contact between the blade and a user. The saws also may include various signals, lights, etc., to inform a user of the status of the saw and the features in operation. Self tests, logic controls and user interfaces are described in more detail in U.S. Provisional Patent Application Ser. No. 60/225,059, titled "Logic Control for Fast Acting Safety System," and U.S. Provisional Patent Application Ser. No. 60/225,094, titled "Motion Detecting System for Use in Safety System for Power Equipment," both filed Aug. 14, 2000.

The table saws described above are configured to absorb the impact of a brake pawl stopping a blade. However, on some table saws, small saws for example, it may be desirable to construct the saw knowing that if the brake pawl stops the blade, the saw would be damaged, perhaps by bending the arbor or other support structure. In fact, the saw may be constructed specifically to absorb the energy of stopping the blade by destroying or damaging part of the saw. Such saws may be thought of as disposable to the extent they are intended to be used only until an accident occurs requiring the brake pawl to stop the blade. A disposable saw may be less expensive to manufacture, and reduced injury to a user in the event of an accident would more than justify the entire cost of the saw.

INDUSTRIAL APPLICABILITY

The present invention is applicable to power equipment, and specifically to table saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
a table defining a work surface;
a rotatable blade extendable up through the work surface;
an elevation mechanism adapted to move the blade up and down relative to the table;
a detection system adapted to detect a dangerous condition between a person and the blade;
a brake adapted to engage and decelerate the blade when the detection system detects the dangerous condition between the person and the blade, where the brake pivots up and down relative to the table to maintain an operative position relative to the blade when the elevation mechanism moves the blade up and down relative to the table.

2. The table saw of claim 1 where the elevation mechanism is adapted to pivot the blade up and down.

3. The table saw of claim 1 where moving the blade up and down pivots the brake up and down.

4. The table saw of claim 1 where the elevation mechanism is adapted to pivot the blade up and down and where pivoting the blade up and down pivots the brake up and down.

5. The table saw of claim 1 where the elevation mechanism includes an arbor block adapted to pivot around a pin, and further comprising a brake positioning mechanism adapted to mount the brake to the arbor block so the brake pivots with the arbor block.

6. The table saw of claim 1 where the elevation mechanism includes an arbor block adapted to pivot around a pin, and where the brake pivots around the pin.

* * * * *